UNITED STATES PATENT OFFICE.

MARCUS WECHSLER, OF KENSINGTON, ENGLAND, ASSIGNOR TO GILLMAN AND SPENCER (1902) LIMITED, OF LONDON, ENGLAND, A CORPORATION OF ENGLAND.

METHOD OF PRODUCING ORGANIC COLORING-MATTER.

1,031,602.

Specification of Letters Patent.

Patented July 2, 1912.

No Drawing.

Application filed October 14, 1910. Serial No. 587,107.

*To all whom it may concern:*

Be it known that I, MARCUS WECHSLER, analytical and research chemist, a subject of the King of Great Britain, residing at 136 Sinclair road, Kensington, in the county of London, England, have invented certain new and useful Improvements in Methods of Producing Organic Coloring-Matter, of which the following is a specification.

This invention relates to the manufacture of organic coloring matter such as caramel or caramel substitutes from carbo-hydrates and the like by acting thereon with ammonia either in the free or gaseous state or in any of its compounds.

According to this invention ammonia or a compound thereof is caused to act on any suitable carbo-hydrate the latter being first of all brought to a suitable high temperature.

The temperature which I have found most suitable to which the carbo-hydrate should be brought is 105° C. or thereabout. After the ammonia has been added the temperature is raised for instance it may be raised to 115° C. or to 120° C. or more or less as desired. The mass is maintained at this last-named temperature or thereabout for some time for instance it may be kept at the said temperature for half an hour or more or less according to the quantity of ammonia used and the degree of color required.

According to this invention I prefer to keep the mass at the said high temperature as short a time as is consistent with the adequate and economic preparation of the product according to the ingredients used and the degree of color it is desired to obtain.

According to this invention I carry out the process in two or more fractions each fraction having two stages as above described, for instance I may carry it out in three fractions. In the first fraction I add a portion of the ammonia or ammonia compound it is proposed to use for treating a given quantity of carbo-hydrate, (the latter having previously been heated as aforesaid to 105° C. or thereabout) for instance I may add about say about two thirds of the ammonia in that fraction and then heat up the mass as aforesaid. The mass is then cooled again to its original temperature or thereabout (say the aforesaid temperature of 105° C. or thereabout) and then in the second fraction another portion of the ammonia is added (say about half of that remaining) and the mass again heated to the aforesaid higher temperature and in this case the higher temperature is maintained for a period which may be shorter than the corresponding stage in the first fraction. In the third fraction which is carried out in the same way, the remainder of the ammonia is added. Or instead of completing the process in three fractions as aforesaid I may carry it out in any suitable number of fractions say from 2 to 10 or more if desired; each fraction having two stages viz. a lower and higher temperature stage as aforesaid.

The following is an example of carrying the present invention into practice in three fractions. Take a carbo-hydrate (say glucose) and heat it to 105° C. or thereabout in any suitable vessel either open or closed. In the first fraction add ammonia (say 6% of liquid ammonia for a specific gravity of .880) to the thus heated glucose. Absorption or combination is completed usually in 5 to 15 minutes. Then the temperature of the mass is raised to 115° to 120° C. or thereabout for a short period such as half an hour. Then cool down promptly to about 105° C. and commence the second fraction; and in this second fraction add further liquid ammonia (say 2%). The absorption is completed as rapidly as before (5 to 15 minutes) and then the temperature of the mass is again raised to 115° C. to 120° C. and then maintained for about the same period as before or it may be less. After again cooling to 105° C. for the third fraction add further liquid ammonia (say 2%) and again raise to the said higher temperature and there maintain for a short period. Further according to this invention I may conduct the whole process corresponding to the said fractions in a continuous manner. For instance I may keep one vessel containing the carbo-hydrate to be treated with its temperature at the aforesaid higher temperature (say 115° C. or to 120° C.) and another vessel at the aforesaid lower temperature (say 105° C.). Portions of the contents of the vessel at the higher temperature may be continuously or intermittently from time to time withdrawn in to the vessel at the lower temperature and there the ammonia or further ammonia added as required. The contents of the vessel of lower temperature are in a similar manner returned to the other vessel and this may be continued as long as desired or until the whole process is complete.

The coloring matter obtained by this invention may be used for coloring liquors, sweet meats, gravies, and for any other purposes for which ordinary caramel is employed.

What I claim is:—

1. The method of preparing artificial caramel or caramel substitute which consists in heating glucose substantially to 105° C., adding substantially 6 per cent. of liquid ammonia maintaining the mass at a temperature of from 115° C. to 120° C. for substantially half an hour, reducing the temperature to 105° C. adding 2 per cent. more ammonia, subsequently raising the temperature as before, then cooling and adding a further 2 per cent. of ammonia, and finally raising the temperature as before, substantially as described.

2. The continuous method of making artificial organic coloring matter which consists in maintaining a vessel containing a carbo-hydrate at a temperature substantially of from 115° to 120° C. and another vessel at a temperature of substantially 105° C., passing the carbo-hydrate into the vessel of the lower temperature, adding ammonia and passing the mixture from the vessel at the lower temperature to that at the higher temperature, substantially as and for the purposes set forth.

In witness whereof I have hereunto set my hand in the presence of two witnesses.

M. WECHSLER.

Witnesses:
RIPLEY WILSON,
C. P. LIDDON.